(12) United States Patent
Ahn et al.

(10) Patent No.: US 10,826,952 B2
(45) Date of Patent: Nov. 3, 2020

(54) CONFERENCE ACCESS METHOD AND TERMINAL FOR PERFORMING THE SAME

(71) Applicant: SAMSUNG SDS CO., LTD., Seoul (KR)

(72) Inventors: Ho-Sung Ahn, Seoul (KR); Hee-Tae Yoon, Seoul (KR); Jun-Ho Kang, Seoul (KR); Hong-Hyeon Lee, Seoul (KR); Ji-Won Jung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 80 days.

(21) Appl. No.: 16/174,826

(22) Filed: Oct. 30, 2018

(65) Prior Publication Data

US 2019/0132369 A1 May 2, 2019

(30) Foreign Application Priority Data

Oct. 31, 2017 (KR) .......................... 10-2017-0143115

(51) Int. Cl.
| | |
|---|---|
| *H04L 29/06* | (2006.01) |
| *H04L 12/18* | (2006.01) |
| *H04L 29/08* | (2006.01) |
| *H04N 21/00* | (2011.01) |
| *H04L 29/12* | (2006.01) |

(52) U.S. Cl.
CPC ............ *H04L 65/403* (2013.01); *H04L 12/18* (2013.01); *H04L 12/1818* (2013.01); *H04L 12/1881* (2013.01); *H04L 65/1093* (2013.01); *H04L 67/26* (2013.01); *H04N 21/00* (2013.01); *H04L 61/2514* (2013.01)

(58) Field of Classification Search
CPC ............... H04L 65/403; H04L 12/1818; H04L 65/1093; H04L 12/1881; H04L 12/18; H04L 67/26; H04L 61/2514; H04N 21/00; H04N 7/152; H04N 7/15
USPC .......................................................... 709/204
See application file for complete search history.

(56) References Cited

U.S. PATENT DOCUMENTS

2012/0269335 A1* 10/2012 Goguen .................. H04L 63/10
379/202.01
2018/0026938 A1* 1/2018 Xiang ................. H04L 61/1511
709/245

* cited by examiner

*Primary Examiner* — Tu T Nguyen
(74) *Attorney, Agent, or Firm* — Sughrue Mion, PLLC

(57) ABSTRACT

Provided are a conference access method and a terminal for performing the same. A terminal according to an embodiment of the present disclosure includes: an interface configured to receive a plurality of different access addresses for access to a conference from a conference server; an access attempter configured to attempt to simultaneously access the conference via each of the plurality of access addresses; and a priority allocator configured to collect an access result for each of the plurality of access addresses, and to allocate an access priority to each of the plurality of access addresses based on the access result, wherein the access attempter attempts to access the conference via an access address having a highest access priority among the plurality of access addresses.

20 Claims, 13 Drawing Sheets

(1) 100.100.100.1 : 9090 / UDP / INTERNAL
(2) 100.100.100.1 : 80 / TCP / INTERNAL
(3) 100.100.100.1 : 443 / WSS / INTERNAL
(4) 200.200.200.3 : 443 / WSS / EXTERNAL
(5) 200.200.200.4 : 80 / TCP / EXTERNAL
(6) 200.200.200.5 : 9090 / UDP / EXTERNAL

FIG. 4

| PRIORITY 1 | (1)<br>1.1.1.1 : 9090<br>UDP /<br>INTERNAL | (2)<br>1.1.1.1 : 80<br>TCP /<br>INTERNAL | (3)<br>1.1.1.1 : 443<br>WSS /<br>INTERNAL | (4)<br>2.2.2.3 : 443<br>WSS /<br>EXTERNAL | (5)<br>2.2.2.4 : 80<br>TCP /<br>EXTERNAL | (6)<br>2.2.2.5 : 9090<br>UDP /<br>EXTERNAL |
|---|---|---|---|---|---|---|

FIG. 5

| | (2)<br>1.1.1.1 : 80<br>TCP /<br>INTERNAL | (3)<br>1.1.1.1 : 443<br>WSS /<br>INTERNAL | (4)<br>2.2.2.3 : 443<br>WSS /<br>EXTERNAL | (5)<br>2.2.2.4 : 80<br>TCP /<br>EXTERNAL |
|---|---|---|---|---|
| PRIORITY 1 | | | | |
| PRIORITY 2 | (1)<br>1.1.1.1 : 9090<br>UDP /<br>INTERNAL | (6)<br>2.2.2.5 : 9090<br>UDP /<br>EXTERNAL | | |

FIG. 6

| PRIORITY 1 | (2)<br>1.1.1.1 : 80<br>TCP /<br>INTERNAL | (3)<br>1.1.1.1 : 443<br>WSS /<br>INTERNAL |
|---|---|---|
| PRIORITY 2 | (4)<br>2.2.2.3 : 443<br>WSS /<br>EXTERNAL | (5)<br>2.2.2.4 : 80<br>TCP /<br>EXTERNAL |
| PRIORITY 3 | (1)<br>1.1.1.1 : 9090<br>UDP /<br>INTERNAL | (6)<br>2.2.2.5 : 9090<br>UDP /<br>EXTERNAL |

FIG. 7

| | | |
|---|---|---|
| PRIORITY 1 | (2)<br>1.1.1.1 : 80<br>TCP /<br>INTERNAL | |
| PRIORITY 2 | (3)<br>1.1.1.1 : 443<br>WSS /<br>INTERNAL | |
| PRIORITY 3 | (4)<br>2.2.2.3 : 443<br>WSS /<br>EXTERNAL | (5)<br>2.2.2.4 : 80<br>TCP /<br>EXTERNAL |
| PRIORITY 4 | (1)<br>1.1.1.1 : 9090<br>UDP /<br>INTERNAL | (6)<br>2.2.2.5 : 9090<br>UDP /<br>EXTERNAL |

FIG. 8

| ACCESS INFORMATION | PRIVATE IP ADDRESS | BSSID | PUBLIC IP ADDRESS | ACCESS ORDER TABLE | GENERATING DATE (GENERATING TIME) |
|---|---|---|---|---|---|
| a | 172.16.0.0 | 00:08:52:09:03:BC | 203.109.0.10 | QFFW | APRIL 1, 2017 |
| b | 192.168.0.10 | 00:27:1C:5B:64:20 | 54.12.100.100 | GEYW | JUNE 1, 2017 |

CONFERENCE ACCESS METHOD AND TERMINAL FOR PERFORMING THE SAME

CROSS-REFERENCE TO RELATED APPLICATION(S)

This application claims priority from Korean Patent Application No. 10-2017-0143115, filed on Oct. 31, 2017, in the Korean Intellectual Property Office, the entire disclosure of which is incorporated herein by reference for all purposes.

BACKGROUND

1. Field

Embodiments of the present disclosure relate to technology for access to a conference in a multilateral conference system.

2. Description of the Related Art

Recently, with the development of voice and image processing technology, a conference service technology is being widely used, which provides functions such as voice/video calls, document sharing, screen sharing, writing sharing, and the like between users in a virtual conference room. Each terminal may remotely access a conference, provided by a conference server, to provide a multilateral voice/video conference service to users. Such multilateral voice/video conference may not only reduce travel time and costs, but also enable conference participants to have a face-to-face conference, thereby improving concentration in the conference.

In this case, each of the terminals attempting to access the conference may have different communication environments, and thus the terminals receive different access addresses for access to the conference from the conference server.

General terminals attempt to simultaneously access the conference (i.e., attempt to access the conference by parallel communication) through each of the different access addresses, and the terminals repeat the process at every attempt to access the conference. In this case, however, there are problems in that several threads and ports are used on the terminal side, causing overload on the terminals, and a plurality of sessions are generated on the conference server side, thereby unnecessarily wasting resources.

SUMMARY

Embodiments of the present disclosure relate to technology for a conference system which may reduce a load on the terminal side and the conference server side, and may enable terminals to access a conference in a fast and stable manner.

According to an aspect of the present disclosure, there is provided a terminal including: an interface configured to receive a plurality of different access addresses for access to a conference from a conference server; an access attempter configured to attempt to simultaneously access the conference via each of the plurality of access addresses; and a priority allocator configured to collect an access result for each of the plurality of access addresses, and to allocate an access priority to each of the plurality of access addresses based on the access result, wherein the access attempter attempts to access the conference via an access address having a highest access priority among the plurality of access addresses.

The access result may include one or more of information on access addresses, through which access to the conference has succeeded or failed a predetermined number of times or more, among the plurality of access addresses, and information on time required to access the conference for each of the access addresses.

The information on access addresses may include one or more of IP addresses and port numbers included in the access addresses, communication protocols corresponding to the access addresses, and access locations of a terminal.

The priority allocator may re-allocate the access priority every time access to the conference succeeds.

The priority allocator may divide each of the plurality of access addresses into two or more groups according to a communication environment of accessible terminals for each of the access addresses, and may allocate the access priority to each of the groups.

In response to failing to access the conference via the access address having the highest access priority, the access attempter may exclude the access address having the highest access priority, and may attempt to access the conference via an access address having a highest access priority among remaining access addresses.

In response to succeeding in access to the conference, the access attempter may generate access information by mapping identification information for identifying an area, to which the terminal currently belongs, and time information indicating a current time to an access order table indicative of the access priority for each of the access addresses, and may store the access information in the terminal.

The identification information may include one or more of a private IP address, a Basic Service Set Identifier (BSSID), and a public IP address of the terminal.

Upon receiving a push message indicating that one or more other terminals have accessed the conference, the interface may multicast a confirmation message to confirm whether the other terminals exist in the same area, and upon receiving the confirmation message multicast by the one or more other terminals, the interface may refer to the identification information and may transmit, to the one or more other terminals, access information corresponding to the area among access information items stored in the terminal.

The interface may receive, from the one or more other terminals, access information stored in the other terminals; and the access attempter may refer to the time information to determine most recently generated access information based on at least one of one or more access information items received from the other terminals and the access information items stored in the terminal, and may attempt to access the conference by using the most recently generated access information.

According to another aspect of the present disclosure, there is provided a conference access method performed by a terminal, the method including: receiving, by an interface of the terminal, a plurality of different access addresses for access to a conference from a conference server; by an access attempter of the terminal, attempting to simultaneously access the conference via each of the plurality of access addresses; by a priority allocator of the terminal, collecting an access result for each of the plurality of access addresses; by the priority allocator, allocating an access priority to each of the plurality of access addresses based on the access result; and by the access attempter, attempting to access the conference via an access address having a highest access priority among the plurality of access addresses.

The access result may include one or more of information on access addresses, through which access to the conference has succeeded or failed a predetermined number of times or more, among the plurality of access addresses, and information on time required to access the conference for each of the access addresses.

The information on access addresses may include one or more of IP addresses and port numbers included in the access addresses, communication protocols corresponding to the access addresses, and access locations of a terminal.

The allocating of the access priority may include reallocating the access priority every time access to the conference succeeds.

The allocating of the access priority may include dividing each of the plurality of access addresses into two or more groups according to a communication environment of accessible terminals for each of the access addresses, and allocating the access priority to each of the groups.

The conference access method may further include, subsequent to the attempting to access the conference via the access address having the highest access priority: by the access attempter, in response to failing to access the conference via the access address having the highest access priority, excluding the access address having the highest access priority and attempting to access the conference via an access address having a highest access priority among remaining access addresses.

The conference access method may further include, subsequent to the attempting to access the conference via the access address having the highest access priority: by the access attempter, in response to succeeding in access to the conference, generating access information by mapping identification information for identifying an area, to which the terminal currently belongs, and time information indicating a current time to an access order table indicative of the access priority for each of the access addresses; and by the access attempter, storing the access information in the terminal.

The identification information may include one or more of a private IP address, a Basic Service Set Identifier (BSSID), and a public IP address of the terminal.

The conference access method may further include, subsequent to the storing of the access information in the terminal: by the interface, upon receiving a push message indicating that one or more other terminals have accessed the conference, multicasting a confirmation message to confirm whether the other terminals exist in the same area; and by the interface, upon receiving the confirmation message multicast by the one or more other terminals, referring to the identification information and transmitting, to the one or more other terminals, access information corresponding to the area among access information items stored in the terminal.

The conference access method may further include, prior to the attempting to access the conference via the access address having the highest access priority: by the interface, receiving from the one or more other terminals access information stored in the other terminals; by the access attempter, referring to the time information to determine most recently generated access information based on at least one of one or more access information items received from the other terminals and the access information items stored in the terminal; and by the access attempter, attempting to access the conference by using the most recently generated access information.

BRIEF DESCRIPTION OF THE DRAWINGS

FIG. 3 is a diagram illustrating an example of a plurality of access addresses according to an embodiment of the present disclosure.

FIG. 4 is a diagram explaining an example where a priority allocator allocates an access priority to a plurality of access addresses according to an embodiment of the present disclosure.

FIG. 5 is a diagram explaining an example where a priority allocator allocates an access priority to a plurality of access addresses according to an embodiment of the present disclosure.

FIG. 6 is a diagram explaining an example where a priority allocator allocates an access priority to a plurality of access addresses according to an embodiment of the present disclosure.

FIG. 7 is a diagram explaining an example where a priority allocator allocates an access priority to a plurality of access addresses according to an embodiment of the present disclosure.

FIG. 8 is a diagram illustrating an example of access information according to an embodiment of the present disclosure.

DETAILED DESCRIPTION

Hereinafter, embodiments of the present disclosure will be described in detail with reference to the accompanying drawings. The following detailed description is provided for comprehensive understanding of a method, an apparatus, and/or a system described herein. However, it is merely exemplary and the present disclosure is not limited thereto.

In the following description, a detailed description of known functions and configurations incorporated herein will be omitted when it may obscure the subject matter of the present disclosure. Further, the terms used throughout this specification are defined in consideration of the functions of the present disclosure, and can be varied according to a purpose of a user or manager, or precedent and so on. Therefore, definitions of the terms should be made on the basis of the overall context. It should be understood that the terms used herein should be considered in a description sense only and not for purposes of limitation. Any references to singular may include plural unless expressly stated otherwise. In the present specification, it should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 1:
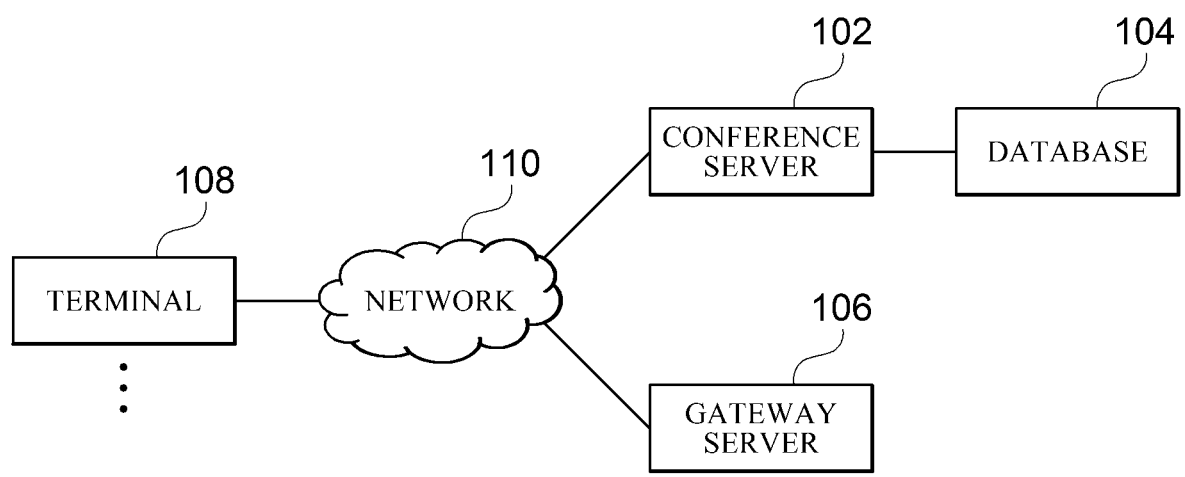
FIG. 1 is a block diagram illustrating a detailed configuration of a conference system according to an embodiment of the present disclosure.

FIG. 1 is a block diagram illustrating a detailed configuration of a conference system 100 according to an embodiment of the present disclosure. As illustrated in FIG. 1, the conference system 100 according to an embodiment of the present disclosure includes a conference server 102, a database 104, a gateway server 106, and a plurality of terminals 108.

The conference server 102 is a server for providing a conference service between two or more terminals 108. In the embodiments of the present disclosure, the conference service refers to a service for providing functions such as voice/video calls, document sharing, screen sharing, writing sharing, and the like between users in a virtual conference room. The conference server 102 may initiate a conference at the request of a conference manager or a conference initiator, and may provide a web service for access to the conference. The term "conference" is herein used in a broad sense to encompass an audio conference, a web conference, and the like. The terminals 108 may access a web page provided by the conference server 102, and may request access to the conference.

Further, at the request of the terminals 108 for access to the conference, the conference server 102 may receive a plurality of different access addresses for access to the conference from the database 104, and may transmit the received access addresses to the terminals 108. Here, each of the access addresses may include different IP addresses/port numbers for access to the conference. In this case, a communication environment of the accessible terminals 108 may be different for each of the access addresses.

The terminals 108 may attempt to simultaneously access the conference (i.e., attempt to access by parallel communication) via each of the plurality of access addresses. The terminals 108 may repeat the process at every attempt to access the conference. In this case, however, several threads and ports are used on the terminal side, causing excessive load on the terminals 108, and a plurality of sessions are generated on the conference server side, unnecessarily wasting resources. In order to solve such problems, upon completing (i.e. succeeding) access to the conference by parallel communication a predetermined number of times or more (e.g., five times or more), the terminals 108 according to the embodiments of the present disclosure may sequentially attempt to access the conference in descending order of access success rates according to conference access patterns of the terminals 108, which will be described in detail with reference to FIGS. 4 to 7.

The database 104 is a storage for storing a plurality of access addresses accessible by the terminals 108. As described above, at the request of the terminals 108 for access to the conference, the conference server 102 may transmit a request for the plurality of access addresses for access to the conference to the database 104, and may receive the plurality of access addresses from the database 104.

The gateway server 106 is connected to each gateway (not shown) for access to the conference, and provides an access result of the terminals 108 for each of the plurality of access addresses to the terminals 108. Here, each gateway may be connected to the conference server 102, and the terminals 108 may access the conference, provided by the conference server 102, via at least one gateway. As described above, the terminals 108 may attempt to simultaneously access the conference via each of the plurality of access addresses.

Once terminals 108 have completed access to the conference, the gateway server 106 may transmit an access result for each of the plurality of access addresses to the terminals 108. Here, the access result may include one or more of information on access addresses, through which access to the conference has succeeded or failed a predetermined number of times or more, among the plurality of access addresses, and information on time required to access the conference for each of the access addresses. Further, the information on access addresses may include one or more of the following: IP addresses and port numbers included in the access addresses; communication protocols corresponding to the access addresses; and access locations of the terminals. As will be described below, the terminals 108 may collect, from the gateway server 106, an access result for each of the plurality of access addresses, and may allocate an access priority to each of the plurality of access addresses based on the access result. Then, the terminals 108 may attempt to access the conference via an access address having the highest access priority among the plurality of access addresses.

In addition, once the terminals 108 have completed access to the conference, the gateway server 106 may receive, from the terminals 108, information on a private IP address, a Basic Service Set Identifier (BSSID), and the like of the terminals 108; and the gateway server 106 may identify a public IP address of the terminals 108 based on the received information, and may transmit the identified public IP address to the terminals 108. As will be described below, the terminals 108 may generate access information by mapping identification information, including the private IP address, the BSSID, the public IP address, and the like of the terminals 108, and time information, indicating a current time, to an access order table indicative of access priorities for each of the access addresses, and may store the generated access information in an internal storage of the terminals 108.

The terminals 108 may be terminals used by ordinary users participating in (or accessing) a conference provided by the conference server 102, and may include all types of communication devices, such as a desktop computer, a laptop computer, a tablet PC, a smartphone, and the like, which may receive a conference service.

As described above, in response to input by a user, the terminals 108 may access the web page provided by the conference server 102 to request access to the conference, and may receive a plurality of different access addresses for access to the conference from the conference server 102. Further, the terminals 108 may attempt to simultaneously access the conference via each of the plurality of access addresses, and may collect an access result for each of the plurality of access addresses.

In addition, the terminals 108 may allocate an access priority to each of the plurality of access addresses based on the access result, and may attempt to access the conference via an access address having the highest access priority among the plurality of access addresses. When failing to access the conference via the access address having the highest access priority, the terminals 108 may attempt to access the conference via an access address having the highest access priority among the remaining access addresses excluding the access address having the highest access priority. In this manner, the terminals 108 may sequentially attempt to access the conference in descending order of access priorities of the access addresses. Further, every time access to the conference succeeds, the terminals 108 may re-allocate an access priority to each of the access addresses, and thus may continuously update the access priorities for each of the access addresses. In addition, the terminals 108 may divide each of the plurality of access addresses into two or more groups according to a communication environment of the accessible terminals 108 for each of the access addresses, and may allocate an access priority to each of the groups.

Moreover, once access to the conference succeeds, the terminals 108 may generate access information by mapping identification information (e.g., private IP address, BSSID, public IP address, etc.) of the terminals 108 and time information indicating a current time to an access order table indicative of access priorities for each access address (or each group to which the access addresses belong), and may store the generated access information in an internal storage of the terminals 108. If one or more other terminals located in the same area as the terminals 108 access the conference, the terminals 108 may share the access information with the one or more other terminals. The identification information is information for identifying an area to which the terminals 108 belong, and the terminals 108 may refer to the identification information and may transmit, to the one or more other terminals, access information corresponding to an area, to which the one or more other terminals currently belong, among the one or more access information items included in the terminals 108 (i.e., a specific private IP address pattern, a specific BSSID pattern, or access information corresponding to a specific public IP address among the access information items).

Specifically, when the one or more other terminals access the conference, the terminals 108 receive a push message indicating entry of a new participant, and then the terminals 108 may multicast a confirmation message to confirm whether the one or more other terminals exist in the same area (i.e., same network area) as the terminals 108. For example, in the case where the one or more other terminals newly access the conference, the terminals 108 may receive a push message, indicating that the one or more other terminals have accessed the conference, from the gateway server 106. However, the push message is not necessarily required to be received from the gateway server 106, and may also be received from the conference server 102 or a separate push server (not shown). In addition, each of the one or more other terminals participating in the conference may also multicast the confirmation message. If the terminals 108 receive the confirmation message multicast by the one or more other terminals, the terminals 108 may determine that the one or more other terminals exist in the same area, and may transmit, to the other terminals, access information corresponding to the area, to which the other terminals currently belong, among the access information items stored in the terminals 108. Accordingly, when attempting to access the conference later, the one or more other terminals may use the access information received from the terminals 108. Here, for convenience of information, description is made based on an example where the terminals 108 share information with the other terminals, but the same may apply to the opposite case. Further, when the terminals 108 receive access information from each of the plurality of other terminals, the terminals 108 may refer to time information included in each access information to determine access information which is generated most recently, and may attempt to access the conference by using the most recently generated access information.

In addition, the conference server 102, the gateway server 106, and the terminal 108 may transmit and receive data to and from each other through the network 110. In some embodiments, examples of the network 110 may include Internet, one or more local area networks, wire area networks, cellular networks, mobile networks, other types of networks, or a combination of these networks.

Moreover, it should be noted that for convenience of explanation, the conference server 102, the database 104, and the gateway server 106 are illustrated as separate parts, but the present disclosure is not limited thereto, and the conference server 102, the database 104, and the gateway server 106 are separated only in terms of functions, and may be located in a single hardware component.

In one embodiment, the conference server 102, the database 104, the gateway 106, and the terminals 108 may be implemented in one or more computing devices including one or more processors and a computer-readable recording medium connected to the processors. The computer-readable recording medium may be located inside or outside the processors, and may be connected to the processors by various well-known means. The processors located inside the computing devices may allow each computing device to operate according to the exemplary embodiments described herein. For example, the processors may execute instructions stored in the computer-readable recording medium; and when the instructions stored in the computer-readable recording medium are executed by the processors, the instructions may cause the computing devices to perform operations according to the exemplary embodiments described herein.

Figure 2:
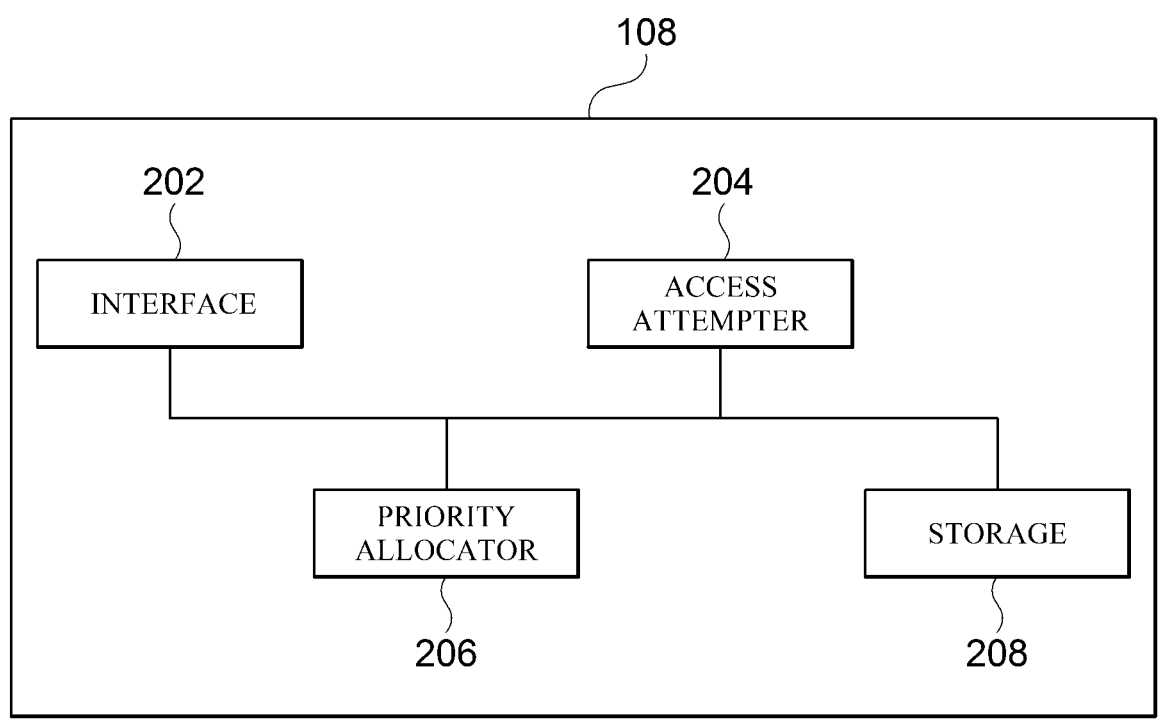
FIG. 2 is a block diagram illustrating a detailed configuration of a terminal according to an embodiment of the present disclosure.

FIG. 2 is a block diagram illustrating a detailed configuration of a terminal 108 according to an embodiment of the present disclosure. As illustrated in FIG. 2, the terminal 108 according to an embodiment of the present disclosure includes an interface 202, an access attempter 204, a priority allocator 206, and a storage 208.

In response to input by a user, the interface 202 may access a web page provided by a conference server 102 to request access to the conference, and may receive a plurality of different access addresses for access to the conference from the conference server 102.

The access attempter 204 attempts to simultaneously access the conference (i.e., attempt to access by parallel communication) via each of the plurality of access addresses. The access attempter 204 may repeatedly attempt to access the conference by parallel communication a predetermined number of times or more.

The priority allocator 206 may collect an access result for each of the plurality of access addresses, and may allocate an access priority to each of the plurality of access addresses based on the access result. Every time access to the conference succeeds, the priority allocator 206 may re-allocate an access priority to each access address. Further, the priority allocator 206 may divide each of the plurality of access addresses into two or more groups according to a communication environment of the accessible terminal 108 for each access address, and may allocate access priorities for each of the groups.

Then, when attempting to access the conference, the access attempter 204 may use an access address (or a group to which the access address belongs) having the highest access priority among the plurality of access addresses. If failing to access the conference via the access address (or the group to which the access address belongs) having the highest access priority, the access attempter 204 may attempt to access the conference via an access address having the highest access priority among the remaining access addresses (or the remaining groups) excluding the access address (or the group to which the access address belongs) having the highest access priority.

Further, once access to the conference succeeds, the access attempter 204 may generate access information by mapping identification information (e.g., private IP address, BSSID, public IP address, etc.) for identifying an area, to which the terminal 108 currently belongs, and time information indicating a current time to an access order table indicative of access priorities for each access address (or each group to which the access addresses belong), and may store the generated access information in the storage 208.

In addition, upon receiving a push message, indicating that one or more other terminals have accessed the conference, from the gateway server 106, the conference server 102, or a push server, the interface 202 may multicast a confirmation message to confirm whether the one or more other terminals exist in the same area as the terminal 108. Upon receiving the confirmation message multicast by the one or more other terminals, the interface 202 may refer to the identification information and may transmit, to the other terminals, access information corresponding to the area, to which the other terminals currently belong, among the access information items stored in the terminal 108. Likewise, the interface 202 may also receive, from the one or more other terminals, access information stored in the other terminals. In this case, the access attempter 204 may refer to one or more access information items, received from the other terminals, and time information included in the access information items stored in the terminal 108, to determine access information which is generated most recently, and may attempt to access the conference by using the most recently generated access information.

FIG. 3 is a diagram illustrating an example of a plurality of access addresses according to an embodiment of the present disclosure. As described above, each of the plurality of access addresses may include different IP addresses (e.g., 100.100.100.1)/port numbers (e.g., 9090) for access to the conference. In this case, a communication environment of the accessible terminal 108 may be different for each of the access addresses. The communication environment may be a communication protocol currently in use (e.g., Transmission Control Protocol (TCP), User Datagram Protocol (UDP), Web Socket Secure (WSS), etc.), a current location of the terminal 108 (e.g., information on whether the terminal 108 is currently located inside or outside (i.e., internal/external) a company building), and the like.

For example, assuming that there are access addresses 1 to 6, the access address 1 is located inside a company building and is accessible only by the terminal 108 employing the UDP; the access address 2 is located inside a company building and is accessible only by the terminal 108 employing the TCP; the access address 3 is located inside a company building and is accessible only by the terminal 108 employing the WSS; the access address 4 is located outside company building and is accessible only by the terminal 108 employing the WSS; the access address 5 is located outside a company building and is accessible only by the terminal 108 employing the TCP; and the access address 6 is located outside a company building and is accessible only by the terminal 108 employing the UDP. However, this is merely exemplary, and the communication environment for each access address accessible by the terminal 108 is not limited thereto.

FIGS. 4 to 7 are diagrams explaining an example where the priority allocator 206 allocates an access priority to a plurality of access addresses according to an embodiment of the present disclosure. As described above, the access attempter 204 may attempt to simultaneously access the conference via each of the plurality of access addresses, and may repeatedly attempt to access the conference several times by parallel communication. Every time access to the conference succeeds, the priority allocator 206 may identify a conference access pattern of the terminal 108 by collecting an access result for each of the plurality of access addresses, and may allocate an access priority for each access address (or each group) based on the access result.

For example, based on the following access results (or access patterns), the priority allocator 206 may divide the plurality of access addresses into two or more groups, and may allocate an access priority to each group.

in the case of access to the conference via a specific access address, the access via the specific access address failed repeatedly a predetermined number of times or more (e.g., 10 times)
  in the case of access to the conference via access addresses accessible by using only a specific communication protocol, all the accesses via the access addresses failed repeatedly a predetermined number of times or more (e.g., 5 times)
  in the case of access to the conference via access addresses accessible only in a specific band (e.g., internal access or external access), all the accesses via the access addresses failed repeatedly a predetermined number of times or more (e.g., 5 times)
  in the case of access to the conference via a specific access address, access via the specific address requires a longer time than an average time required for access to the conference via all the other access addresses FIG. 4 is a diagram illustrating a state before an access priority is allocated to the plurality of access addresses illustrated in FIG. 3. In this case, the access attempter 204 may attempt to simultaneously access the conference via each of the plurality of access addresses. Here, it is assumed that access by the terminal 108 using the UDP has repeatedly failed a predetermined number of times or more due to a firewall.

In this case, as illustrated in FIG. 5, the priority allocator 206 may allocate access priority 2 to the access addresses 1 and 6 which are accessible only by the UDP; and may allocate access priority 1 to the remaining access addresses. Then, the access attempter 204 may first attempt to access the conference by using an access address included in a group of the access priority 1, and then may attempt to access the conference by using an access address included in a group of the access priority 2. If a plurality of access addresses are included in one group, the access attempter 204 may attempt to simultaneously access the conference by using only the access addresses included in the group.

Then, it is assumed that external access by the terminal 108 has repeatedly failed a predetermined number of times or more due to a proxy environment inside a company building.

In this case, as illustrated in FIG. 6, the priority allocator 206 may allocate access priority 3 to the access addresses 1 and 6 which are accessible only by the UDP; and may allocate access priority 2 to the access addresses 4 and 5 which are accessible only externally; and may allocate access priority 1 to the remaining access addresses. Accordingly, the access attempter 204 may sequentially attempt to access the conference in the order of a group of the access priority 1, a group of the access priority 2, and a group of the access priority 3. The priority allocator 206 may repeat the process until the last access address remains in the group of the access priority 1.

Further, referring to FIG. 7, in the case where access by the TCP is faster than access by the WSS, the priority allocator 206 may adjust the access address 3 included in the group of the access priority 1 of FIG. 6 to the group of the access priority 2; and may adjust the groups of the access priorities 2 and 3 of FIG. 6 to the groups of the access priorities 3 and 4. As a result, only the access address 2 remains in the group of the access priority 1, in which case the access attempter 204 may first attempt to access the conference via the access address 2 having the highest access priority. That is, the access attempter 204 may sequentially attempt to access the conference in the order of the group of the access priority 1, the group of the access priority 2, the group of the access priority 3, and the group of the access priority 4. As described above, every time access to the conference succeeds, the access attempter 204 may re-allocate an access priority for each group, and thus may continuously update an access order table. Here, the access order table refers to a table indicative of an access priority for each group illustrated in FIGS. 4 to 7.

In addition, when access to the conference succeeds, the access attempter 204 may generate access information by mapping identification information of the terminal 108 and time information indicating a current time to the access order table, and may store the generated access information in the storage 208. As described above, the terminal 108 may share the access information with other terminals located in the same area.

FIG. 8 is a diagram illustrating an example of access information according to an embodiment of the present disclosure. As described above, once access to the conference succeeds, the terminal 108 may generate access information by mapping identification information for identifying an area, to which the terminal 108 currently belongs, and time information indicating a current time to an access order table indicative of an access priority for each access address, and may store the generated access information in the terminal 108. Generally, a user may attempt to access the conference when moving around in various areas (e.g., home, company, etc.) while carrying the terminal 108, in which case it is required to distinguish patterns of access to the conference depending on areas to which the terminal 108 belongs, i.e., locations of the terminal 108. Accordingly, by matching identification information of the terminal 108 with the access order table and storing the identification information, it is possible to determine an area in which the access order table is useful.

Referring to FIG. 8, access information 'a' is mapped to a private IP address "172.16.0.0", BSSID "00:08:52:09:03:BC", a public IP address "203.109.0.10", an access order table "QFFW", and a current time (or a current date) "Apr. 1, 2017" respectively; and access information 'b' is mapped to a private IP address "192.168.0.10", BSSID "00:27:1C:5B:64:20", a public IP address "54.12.100.100", an access order table "GEYW", and a current time (or a current date) "Jun. 1, 2017" respectively. In the above example, the access order table "QFFW" is a table associated with access priorities for each access address accumulated while the terminal 108 uses a conference service on the first floor of a company building; and the access order table "GEYW" is a table associated with access priorities for each access address accumulated while the terminal 108 uses a conference service on the eighth floor of a company building. The illustrated identification information of the terminal 108 may be used to determine an area in which the access order table is useful, and the time information may be used to determine an access information item to be used when there are a plurality of access information items.

Figure 9:
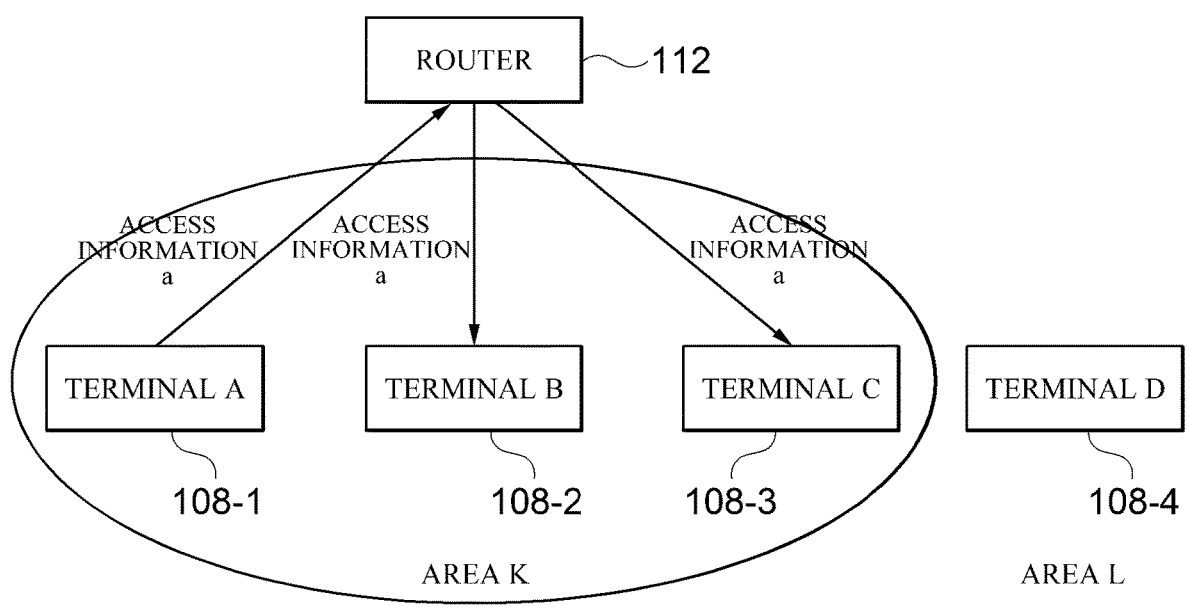
FIG. 9 is a diagram illustrating an example where a terminal shares access information with other terminals located in the same area as the terminal according to an embodiment of the present disclosure.

FIG. 9 is a diagram illustrating an example where a terminal 108 shares access information with other terminals located in the same area as the terminal 108 according to an embodiment of the present disclosure. Here, it is assumed that terminal A (108-1), terminal B (108-2), and terminal C (108-3) are located in the same area (e.g., first floor in a company building), and terminal D (108-4) is located in a different area (e.g., eighth floor in the company building).

Referring to FIG. 9, in the case where while the terminal A (108-1) accesses a conference, the terminal B (108-2), the terminal C (108-3), and the terminal D (108-4) newly access the conference, the terminal A (108-1) multicasts a confirmation message to determine whether there are other terminals in the same area as the terminal A (108-1), and may receive the confirmation message from the terminal B (108-2) and the terminal C (108-3). Accordingly, the terminal A (108-1) determines that the terminal B (108-2) and the terminal C (108-3) are located in the same area, and may multicast access information, e.g., access information 'a', which corresponds to the area among the access information items stored in the terminal A (108-1), to transmit the access information to the terminal B (108-2) and the terminal C (108-3).

Figure 10:
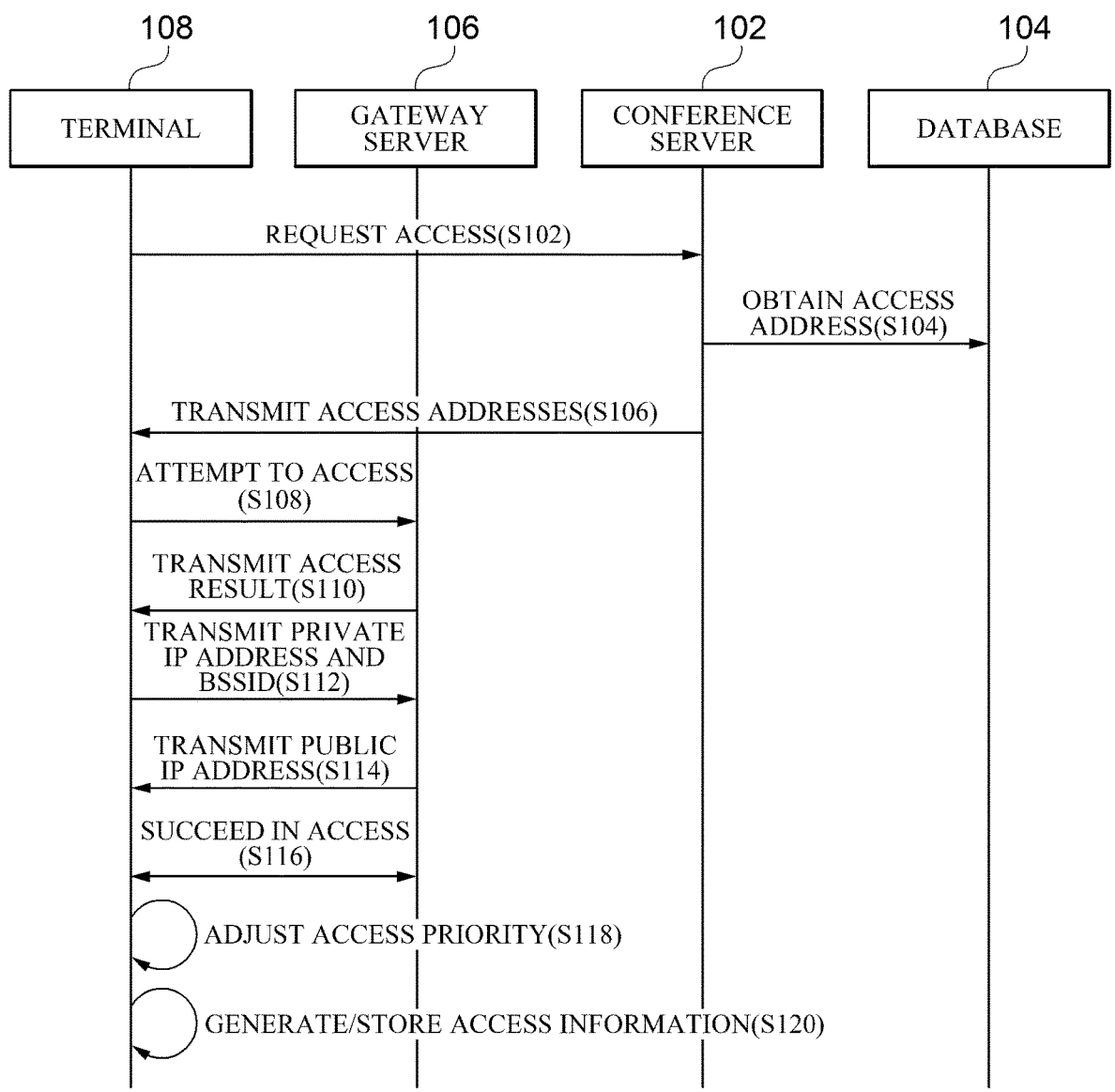
FIG. 10 is a flowchart explaining a conference access method according to an embodiment of the present disclosure.

FIG. 10 is a flowchart explaining a conference access method according to an embodiment of the present disclosure. While the flowchart illustrated in FIG. 10 shows that the method is divided into a plurality of operations, at least some of the operations may be performed in different order, may be combined to be performed concurrently, may be omitted, may be performed in sub-operations, or one or more operations not shown in the drawing may be added and performed.

In S102, in response to input by a user, the terminal 108 accesses a web page provided by the conference server 102 and requests access to a conference.

In S104, the conference server 102 obtains a plurality of different access addresses for accessing the conference from the database 104.

In S106, the conference server 102 transmits the plurality of access addresses to the terminal 108.

In S108, the terminal 108 attempts to simultaneously access the conference via each of the plurality of access addresses. In this case, the terminal 108 may attempt to access the conference via the gateway server 106.

In S110, the gateway serer 106 transmits an access result for each of the plurality of access addresses to the terminal 108.

In S112, the terminal 108 transmits its own private IP address and BSSID to the gateway server 106.

In S114, the gateway server 106 identifies a public IP address of the terminal 108 based on the private IP address and BSSID, and transmits the public IP address to the terminal 108.

In S116, the terminal 108 has completed access to the conference via the gateway server 106.

In S118, the terminal 108 allocates an access priority to each of the plurality of access addresses based on an access result for each of the plurality of access addresses.

In S120, the terminal 108 generates access information by mapping identification information of the terminal 108 and time information indicating a current time to an access order table indicative of an access priority for each access address, and stores the generated access information in the terminal 108.

Figure 11:
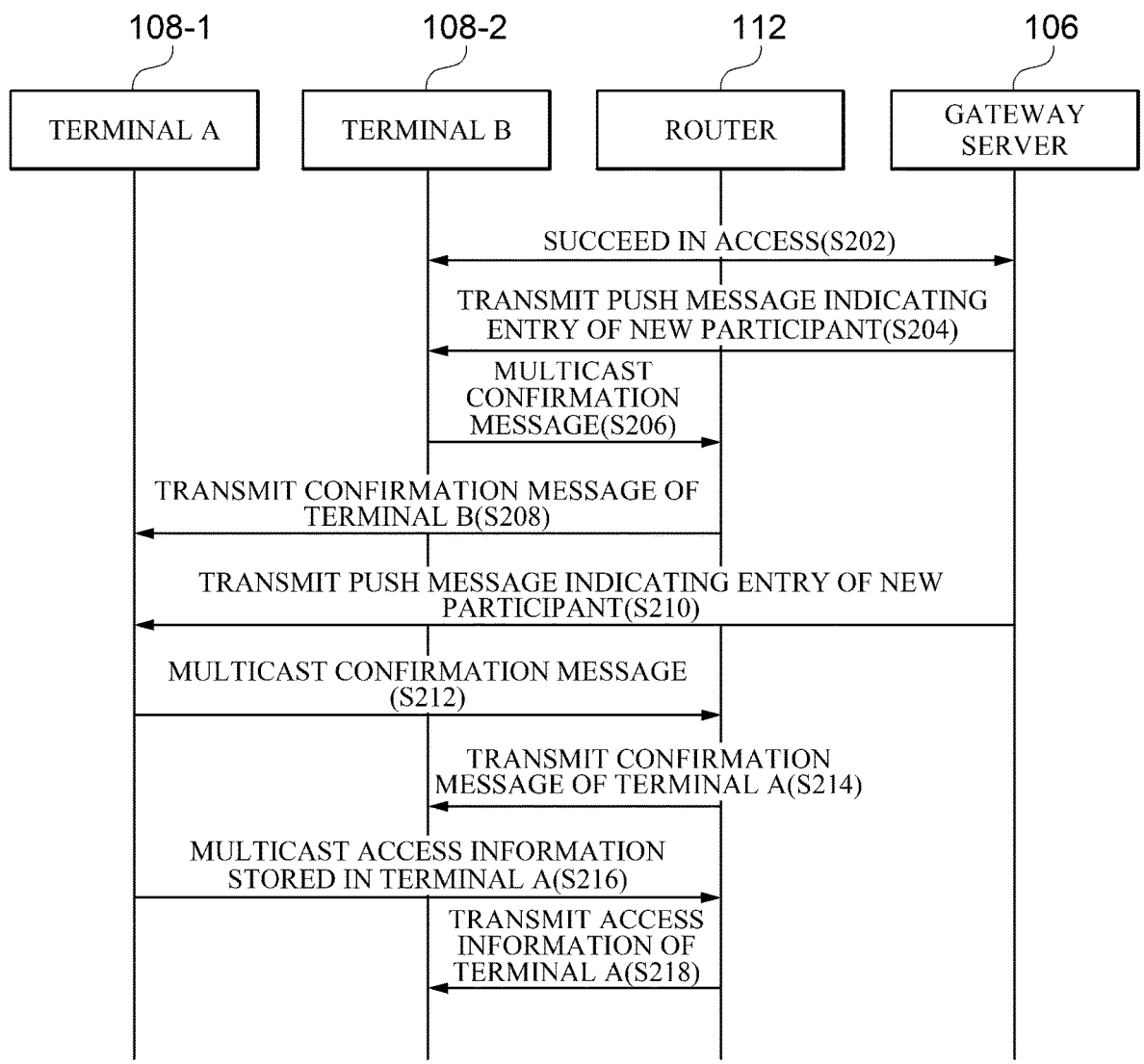
FIG. 11 is a flowchart explaining a method of sharing access information between terminals according to an embodiment of the present disclosure.

FIG. 11 is a flowchart explaining a method of sharing access information between terminals 108 according to an embodiment of the present disclosure. While the flowchart illustrated in FIG. 11 shows that the method is divided into a plurality of operations, at least some of the operations may be performed in different order, may be combined to be performed concurrently, may be omitted, may be performed in sub-operations or one or more operations not shown in the drawing may be added and performed. Here, for convenience of explanation, it is assumed that while terminal A (108-1) accesses a conference, terminal B (108-2) located in the same area as the terminal A (108-1) newly accesses the conference.

In S202, the terminal B (108-2) has completed access to the conference via the gateway server 106.

In S204, the gateway server 106 transmits a push message, indicating that the terminal B (108-2) has accessed the conference, to the terminal B (108-2).

In S206, the terminal B (108-2) multicasts a confirmation message to confirm whether other terminals are located in the same area as the terminal B (108-2).

In S208, a router 112 transmits the confirmation message, multicast by the terminal B (108-2), to the terminal A (108-1) located in the same area as the terminal B (108-2).

In S210, the gateway server 106 transmits the push message, indicating that the terminal B (108-2) has accessed the conference, to the terminal A (108-1).

In S212, the terminal A (108-1) multicasts a confirmation message to confirm whether other terminals are located in the same area as the terminal A (108-1).

In S214, the router 112 transmits the confirmation message, multicast by the terminal A (108-1), to the terminal B (108-2) located in the same area as the terminal A (108-1). In this manner, the terminal A (108-1) and the terminal B (108-2) may confirm that they are located in the same area.

In S216, the terminal A (108-1) multicasts access information stored in the terminal A (108-1).

In S218, the router 112 transmits the access information, multicast by the terminal A (108-1), to the terminal B (108-2). In this manner, each of the terminals 108 may multicast a confirmation message to confirm whether other terminals are located in the same area; and if it is determined that other terminals are located in the same area, each of the terminals 108 may multicast access information, corresponding to the area, among the access information items included in each of the terminals 108, thereby sharing their own access information with other terminals.

Figure 12:
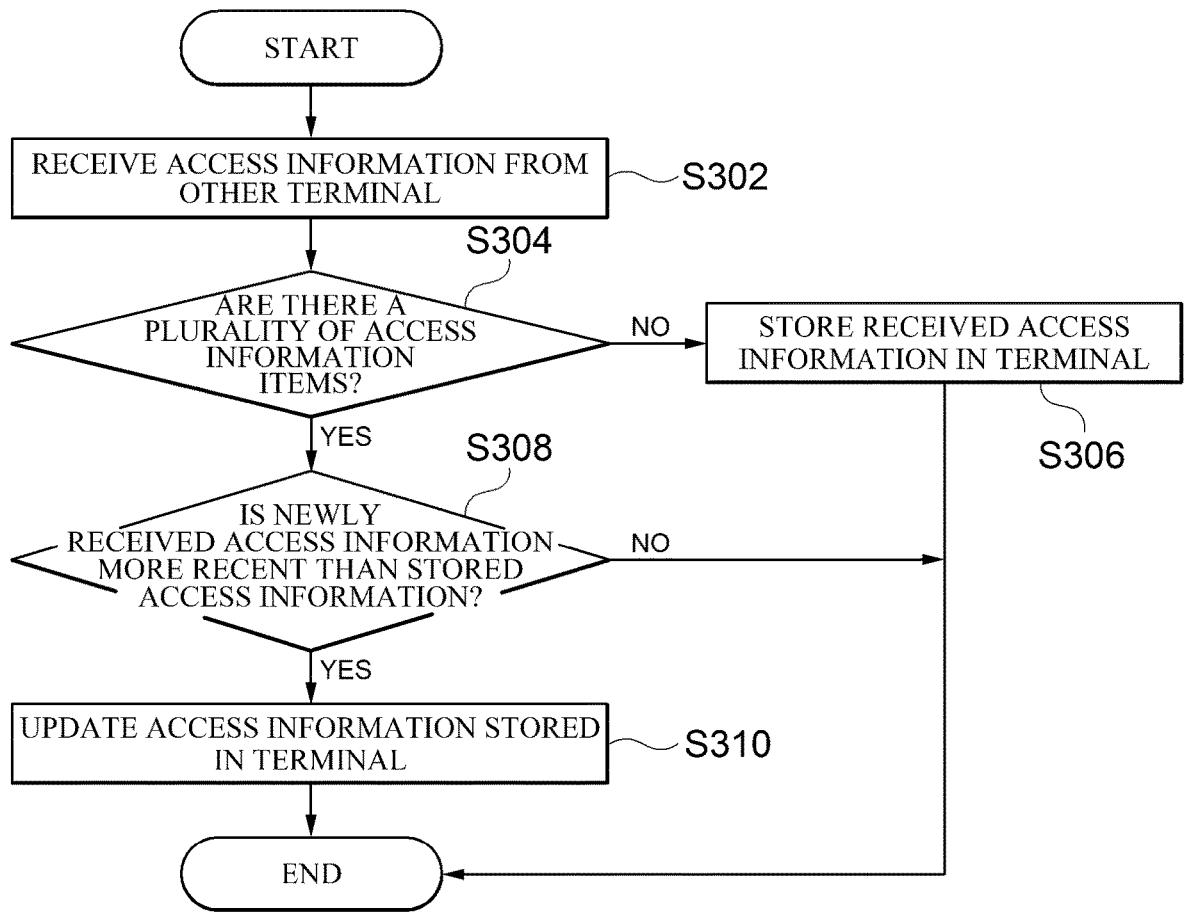
FIG. 12 is a flowchart explaining a method of updating access information by a terminal according to an embodiment of the present disclosure.

FIG. 12 is a flowchart explaining a method of updating access information by a terminal 108 according to an embodiment of the present disclosure.

In S302, the terminal 108 receives access information from one or more other terminals.

In S304, the terminal 108 may determine whether a plurality of access information items are stored in the terminal 108.

In S306, in response to determination in S304 that no access information is stored in the terminal 108, and only one access information item is newly received from the other terminals, the terminal 108 stores the access information received from the other terminals in the terminal 108.

In S308, in response to determination in S304 that access information is already stored in the terminal 108 (i.e., in the case where a plurality of access information items are stored), the terminal 108 determines whether access information newly received from the other terminals is more recent than the stored access information (i.e., whether access information is generated later than the stored access information).

In response to determination in S308 that the access information stored in the terminal 108 is more recent information than the access information newly received from the other terminals, the terminal 108 may discard the access information newly received from the other terminals.

In response to determination in S308 that the access information newly received from the other terminals is more recent information than the access information stored in the terminal 108, the terminal 108 may update the access information stored in the terminal in S310 by replacing the access information stored in the terminal 108 with the access information newly received from the other terminals.

Figure 13:
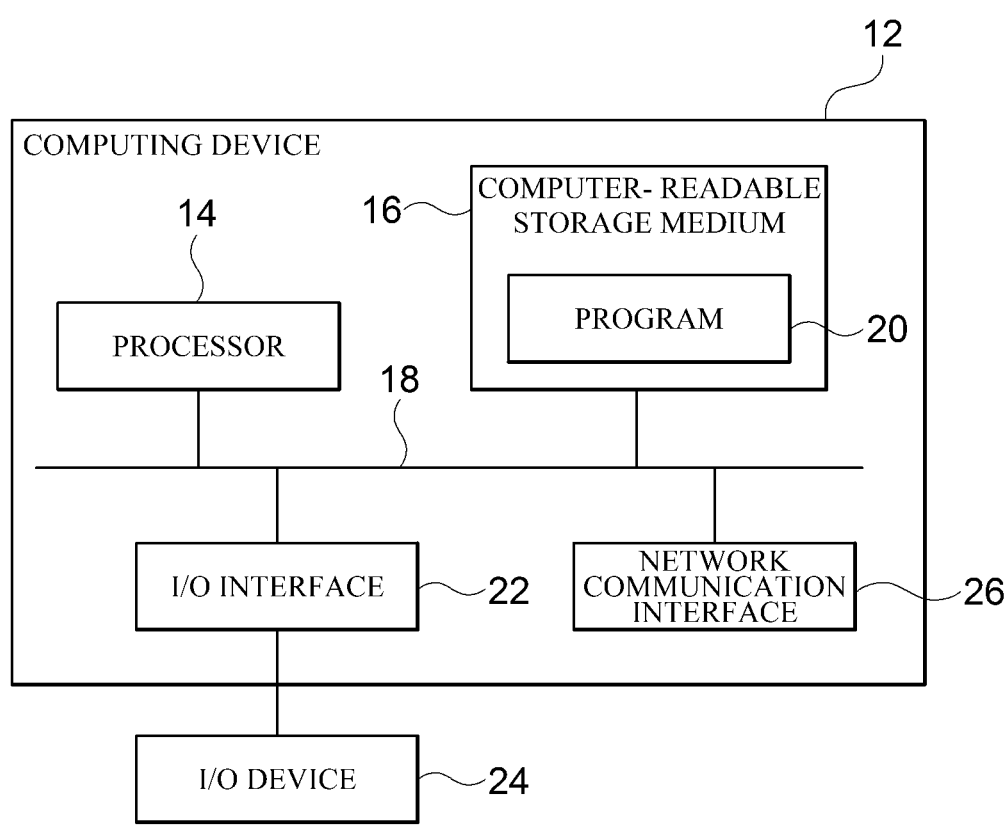
FIG. 13 is a block diagram explaining an example of a computing environment which includes a computing device suitable for use in exemplary embodiments.

FIG. 13 is a block diagram explaining an example of a computing environment 10 which includes a computing device suitable for use in exemplary embodiments. In the illustrated embodiment, each component may include functions and capabilities different from those described below, and may further include components in addition to those described below.

The computing environment 10 includes a computing device 12. In one embodiment, the computing device 12 may be the terminal 108, the conference server 102, or the gateway server 106. The computing device 12 includes at least one processor 14, a computer-readable storage medium 16, and a communication bus 18. The processor 14 may control the computing device 12 to operate according to the above-described exemplary embodiments. For example, the processor 14 may execute one or more programs stored on the computer-readable storage medium 16. The one or more programs may include one or more computer-executable instructions, which when being executed by the processor 14, may cause the computing device 12 to perform operations according to the exemplary embodiments.

The computer-readable storage medium 16 stores computer-executable instructions, program codes, program data, and/or other suitable types of information. The programs 20 stored on the computer-readable storage medium 16 may include a set of instructions which may be executed by the processor 14. In one embodiment, the computer-readable storage medium 16 may be a memory (volatile and non-volatile memory such as a random access memory, or a suitable combination thereof), one or more magnetic disc storage devices, optical disk storage devices, flash memory devices, and other types of storage media that are accessed by the computing device 12 and may store desired information, or a suitable combination thereof.

The communication bus 18 interconnects various components of the computing device 12 including the processor 14 and the computer-readable storage medium 16.

The computing device 12 may further include one or more input/output (I/O) interfaces 22 to provide interfaces for one or more I/O devices 24, and one or more network communication interfaces 26. The 10 interface 22 and the network communication interface 26 are connected to the communication bus 18. The I/O device 24 may be connected to other components of the computing device 12 through the I/O interface 22. The exemplary I/O device 24 may include a pointing device (e.g., mouse, trackpad, etc.), a keyboard, a touch input device (e.g., touch pad, touch screen, etc.), a voice input device, a sound input device, input devices such as various types of sensor devices and/or photographing devices, and/or output devices such as a display device, a printer, a speaker, and/or a network card. The exemplary I/O device 24 may be included in the computing device 12 as a component of the computing device 12, or may be connected to the computing device 12 as a separate device from the computing device 12.

Embodiments of the present disclosure may include a program for performing methods described in this specification on a computer, and a computer-readable recording medium including the program. The computer-readable recording medium may include any one or a combination of a program instruction, a local data file, a local data structure, etc. The medium may be designed and configured specifically for the present disclosure or can be typically available in the field of computer software. Examples of the computer-readable recording medium include a magnetic medium, such as a hard disk, a floppy disk, and a magnetic tape, an optical recording medium, such as a compact disc read only memory (CD-ROM) and a digital versatile disc (DVD), a hardware device, such as a floppy disk, and a hardware device specially configured to store and perform a program instruction, such as a ROM, a random access memory (RAM), and a flash memory. Examples of the program instruction may include a high-level language code executable by a computer with an interpreter, in addition to a machine language code made by a compiler.

According to the embodiments of the present disclosure, terminals sequentially attempt to access a conference in descending order of access success rates, such that access attempts via access addresses having a low access success rate may be reduced. Accordingly, load may be reduced as the conference server does not generate unnecessary sessions, and the terminals may reduce unnecessary threads or ports.

Further, according to the embodiments of the present disclosure, the terminals share stored information on access priorities for each access address with other terminals located in the same area, thereby maximizing the effect of reducing the load and unnecessarily wasted resources. Generally, access environments (network, security, etc.) of users accessing at the same location are almost the same, access information obtained from one terminal may be commonly used in other terminals located in the same area.

Although representative embodiments of the present disclosure have been described in detail, it should be understood by those skilled in the art that various modifications to the aforementioned embodiments can be made without departing from the spirit and scope of the present disclosure. Thus, the scope of the present disclosure is not intended to be limited to the described embodiments, but should be defined by the appended claims and their equivalents.

What is claimed is:

1. A terminal comprising:
   an interface configured to receive a plurality of different access addresses for access to a conference from a conference server;
   an access attempter configured to attempt to simultaneously access the conference via each of the plurality of access addresses; and
   a priority allocator configured to collect an access result for each of the plurality of access addresses, and to allocate an access priority to each of the plurality of access addresses based on the access result,
   wherein the access attempter attempts to access the conference via an access address having a highest access priority among the plurality of access addresses.

2. The terminal of claim 1, wherein the access result comprises one or more of information on access addresses, through which access to the conference has succeeded or failed a predetermined number of times or more, among the plurality of access addresses, and information on time required to access the conference for each of the access addresses.

3. The terminal of claim 2, wherein the information on access addresses comprises one or more of IP addresses and port numbers included in the access addresses, communication protocols corresponding to the access addresses, and access locations of a terminal.

4. The terminal of claim 1, wherein the priority allocator re-allocates the access priority every time access to the conference succeeds.

5. The terminal of claim 1, wherein the priority allocator divides each of the plurality of access addresses into two or more groups according to a communication environment of accessible terminals for each of the access addresses, and allocates the access priority to each of the groups.

6. The terminal of claim 1, wherein in response to failing to access the conference via the access address having the highest access priority, the access attempter excludes the access address having the highest access priority, and attempts to access the conference via an access address having a highest access priority among remaining access addresses.

7. The terminal of claim 1, wherein in response to succeeding in access to the conference, the access attempter generates access information by mapping identification information for identifying an area, to which the terminal currently belongs, and time information indicating a current time to an access order table indicative of the access priority for each of the access addresses, and stores the access information in the terminal.

8. The terminal of claim 7, wherein the identification information comprises one or more of a private IP address, a Basic Service Set Identifier (BSSID), and a public IP address of the terminal.

9. The terminal of claim 7, wherein upon receiving a push message indicating that one or more other terminals have accessed the conference, the interface multicasts a confirmation message to confirm whether the other terminals exist in the same area, and upon receiving the confirmation message multicast by the one or more other terminals, the interface refers to the identification information and transmits, to the one or more other terminals, access information corresponding to the area among access information items stored in the terminal.

10. The terminal of claim 9, wherein:
    the interface receives, from the one or more other terminals, access information stored in the other terminals; and
    the access attempter refers to the time information to determine most recently generated access information based on at least one of one or more access information items received from the other terminals and the access information items stored in the terminal, and attempts to access the conference by using the most recently generated access information.

11. A conference access method performed by a terminal, the method comprising:
    receiving, by an interface of the terminal, a plurality of different access addresses for access to a conference from a conference server;
    by an access attempter of the terminal, attempting to simultaneously access the conference via each of the plurality of access addresses;
    by a priority allocator of the terminal, collecting an access result for each of the plurality of access addresses;

by the priority allocator, allocating an access priority to each of the plurality of access addresses based on the access result; and by the access attempter, attempting to access the conference via an access address having a highest access priority among the plurality of access addresses.

12. The method of claim 11, wherein the access result comprises one or more of information on access addresses, through which access to the conference has succeeded or failed a predetermined number of times or more, among the plurality of access addresses, and information on time required to access the conference for each of the access addresses.

13. The method of claim 12, wherein the information on access addresses comprises one or more of IP addresses and port numbers included in the access addresses, communication protocols corresponding to the access addresses, and access locations of a terminal.

14. The method of claim 11, wherein the allocating of the access priority comprises re-allocating the access priority every time access to the conference succeeds.

15. The method of claim 11, wherein the allocating of the access priority comprises dividing each of the plurality of access addresses into two or more groups according to a communication environment of accessible terminals for each of the access addresses, and allocating the access priority to each of the groups.

16. The method of claim 11, further comprising, subsequent to the attempting to access the conference via the access address having the highest access priority, by the access attempter, in response to failing to access the conference via the access address having the highest access priority, excluding the access address having the highest access priority and attempting to access the conference via an access address having a highest access priority among remaining access addresses.

17. The method of claim 11, further comprising, subsequent to the attempting to access the conference via the access address having the highest access priority:

by the access attempter, in response to succeeding in access to the conference, generating access information by mapping identification information for identifying an area, to which the terminal currently belongs, and time information indicating a current time to an access order table indicative of the access priority for each of the access addresses; and by the access attempter, storing the access information in the terminal.

18. The method of claim 17, wherein the identification information comprises one or more of a private IP address, a Basic Service Set Identifier (BSSID), and a public IP address of the terminal.

19. The method of claim 17, further comprising, subsequent to the storing of the access information in the terminal:

by the interface, upon receiving a push message indicating that one or more other terminals have accessed the conference, multicasting a confirmation message to confirm whether the other terminals exist in the same area; and by the interface, upon receiving the confirmation message multicast by the one or more other terminals, referring to the identification information and transmitting, to the one or more other terminals, access information corresponding to the area among access information items stored in the terminal.

20. The method of claim 19, further comprising, prior to the attempting to access the conference via the access address having the highest access priority:

by the interface, receiving from the one or more other terminals access information stored in the other terminals;

by the access attempter, referring to the time information to determine most recently generated access information based on at least one of one or more access information items received from the other terminals and the access information items stored in the terminal; and by the access attempter, attempting to access the conference by using the most recently generated access information.

* * * * *